United States Patent
Ramirez et al.

(10) Patent No.: US 8,035,935 B2
(45) Date of Patent: Oct. 11, 2011

(54) COUNTERMEASURE FOR EMP-E3 INDUCED CURRENTS

(76) Inventors: Vanessa Ramirez, Miami, FL (US); Alberto Ramirez, Miami, FL (US)

( * ) Notice: Subject to any disclaimer, the term of this patent is extended or adjusted under 35 U.S.C. 154(b) by 0 days.

(21) Appl. No.: 12/589,083

(22) Filed: Oct. 19, 2009

(65) Prior Publication Data

US 2011/0090606 A1    Apr. 21, 2011

(51) Int. Cl.
*H02H 7/04* (2006.01)
(52) U.S. Cl. .......................... 361/35; 361/38
(58) Field of Classification Search .............. 361/35, 361/38
See application file for complete search history.

(56) References Cited

U.S. PATENT DOCUMENTS

| | | | | |
|---|---|---|---|---|
| 1,865,409 A | * | 6/1932 | Boehne | 361/133 |
| 5,867,358 A | * | 2/1999 | Campbell | 361/47 |
| 5,883,774 A | * | 3/1999 | Kida et al. | 361/58 |
| 7,589,943 B2 | * | 9/2009 | Ramirez et al. | 361/35 |

* cited by examiner

*Primary Examiner* — Dharti Patel

(57) ABSTRACT

A countermeasure for mitigating Electromagnetic Pulse E3 (EMP-E3) induced currents flowing through the neutral of a star-connected three-phase power transformer without compromising its neutral end insulation performance. It comprises an external neutral-grounding device; a first linear resistor (R10) is connected from the transformer neutral (N) to ground (G) sized to render said induced currents, for any given EMP-E3 severity, reduced and inconsequential to the equipment operation. Contingently, a second non-linear neutral-grounding resistor (R11) provides a shunting path-to-ground of substantially low resistance, as prevailing by virtue of its non-linearity under large power system fault currents; such a bypass functionality is formulated/designed according to IEEE/ANSI/NEMA recommended insulation coordination guidelines in order to sustain proper protective margins to the equipment neutral basic insulation levels (BIL/BSL).

3 Claims, 1 Drawing Sheet

COUNTERMEASURE FOR EMP-E3 INDUCED CURRENTS

TECHNICAL FIELD

Figure 1:
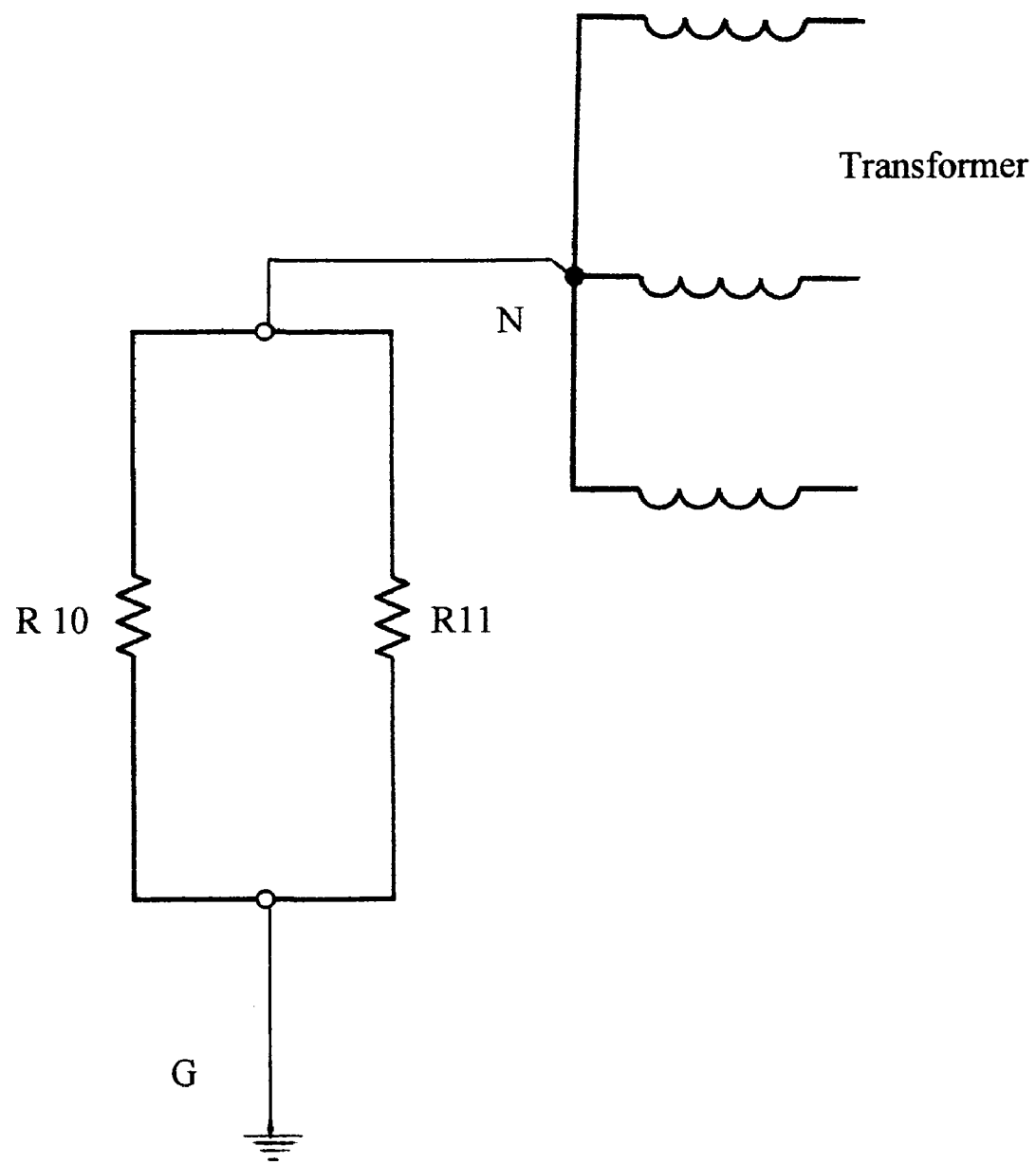

This invention relates to a scheme for mitigating Electromagnetic Pulse (EMP) Induced Currents of the E3 component type in an electric power transformer, by means of a special grounding resistor connected to the neutral end of a star-connected three-phase winding of such apparatus.

BACKGROUND INFORMATION

EMP is a magneto-hydrodynamic phenomenon that consists of a radiation typically stemming from an intensely fluctuating magnetic field, which may be of a nuclear origin or from a variety other means, but that can infiltrate unshielded electrical and electronic systems to produce damaging current/voltage surges. This complex multi-pulse is usually described in terms of three components which have been defined as such by the International Electrotechnical Commission (IEC). Electromagnetic Compatibility (EMC)—Part 2: Environment—Section 9: Description of HEMP environment—Radiated disturbance. Basic EMC publication, IEC 61000-2-9. The aforementioned components of nuclear EMP, as defined by the IEC, are called E1, E2 and E3. The E1 pulse is the very fast EMP component which has an intense electric field that can quickly induce very high voltages in electrical conductors. This is the component that can destroy computers and communication equipment and is too fast for ordinary lightning protectors. Moreover the E1 component is typically produced when gamma radiation from say a nuclear detonation knocks electrons out of the atoms in the upper atmosphere. The electrons travel in a generally downward direction at relativistic speeds of about 90 percent of the speed of light. This essentially produces a large pulse of electrical current vertically in the upper atmosphere over the entire affected area. This electrical current is acted upon by Earth's magnetic field to produce a very brief, yet huge, electromagnetic pulse over the affected area. The E2 component of the pulse has many similarities to the electromagnetic pulses produced by lightning shock waves. Due to the similarities with lightning-caused pulses and the widespread use of lightning protection technology, the E2 pulse is generally considered to be the easiest to protect against. Finally the E3 component is a very slow pulse, lasting tens to hundreds of seconds, that is likely caused by a nuclear event, having the Earth's magnetic field out of the way, followed by the restoration of the magnetic field to its natural place. E3 can produce major induced currents in long electrical conductors, which can then damage components such as power transformers connected to the transmission lines, entering through their phase connections and returning from an earthed neutral.

The present invention deals with the E3 component and its mitigation. In any case these large magnetic fields produced do link/interact with the conductors of transmission and distribution circuits generating induced voltages and currents. The most significant effect can be found on the half-cycle saturation of the equipment magnetic circuits involved, given the very low (quasi DC) nature of the surge. In general this phenomenon represents significant wave distortion causing overexcitation/overheating of essential equipment. This process can readily lead to the malfunction of protective systems and/or plain forced outages as well as to long term blackouts of power grids. A recent comprehensive document: *Report of the Commission to Assess the Threat to The US from Electromagnetic Pulse Attack-Critical National Infrastructures*, April 2008, makes a full discussion of these matters. At the end of Chapter 2, under Recommendations, the group concludes that 'EMP attack on the electrical power system is an extraordinarily serious problem but one that can be reduced below the level of a catastrophic national consequence through focused effort coordinated between industry and government'.

On the other hand, it is clear today from searching the prior art that there is no proposed countermeasure to be found for dealing with EMP-E3. However in a recent (2009) U.S. Pat. No. 7,589,943 by Vanessa Ramirez et al (authors of current application): a Geomagnetically Induced Current (GIC) Reducer, has shown to be useful for solar storms, a special electromagnetic pulse, taking place when the sun emits Solar Flares followed by Corona Mass Ejections (CME). Today there is a discussion whether GIC is, or should be within the EMP family and where; yet EMP E3 is associated to a whole host of surge phenomena; extreme shock waves can be produced by pulse mechanisms completely unrelated to solar activity.

Indeed the wide formulation implies bearing in mind different EM configuration field maps, origin (EMP may be man caused), and most-of-all, duration and severity. Nevertheless, this background plausibly enables the formulation of a universal mitigating concept to tackle this serious threat to society's most critical infrastructure and the technologies that depend on it. In addition, it can be stated that solar storms are to some extent predictable; the sun is constantly being monitored by NOAA, many observatories, satellites and other means; conversely, EMP can be sudden and completely uncertain parametrically; these considerations set a fundamental difference in the protection strategy, duty challenges and preparedness. Indeed an EMP-E3 countermeasure must be able to stand connected to the power network in a quasi-permanent basis, possibly under alert status. For GIC on the other hand, protective relaying short-time insertions are likely, allowing for less robust, low-duty schemes, typically unable to deal with a major perturbation such EMP, in addition requiring a more permanent circuital connection. Fortunately, given the freedom of design afforded by the initial idea it is possible to postulate this invention as being useful and to cope with the general form of sudden EMP, pertaining to its E3 components.

SUMMARY

This invention relates to a scheme for mitigating EMP-E3 Induced Currents in a power transformer by a resistive means designed to drastically reduce such currents. The preferred embodiment is based on a simple resistor connected from the transformer neutral to ground. Therefore this elemental passive device, a resistor, is inserted in series to a circuit made primarily of a transmission lines and a transformer winding with neutral earthed return. Current division, affecting all transmission lines and transformers involved, can reduce the surge into the specific transformer winding to be protected according to basic circuit theory. A mitigation philosophy can be established where EMP-E3 current reduction is accomplished for a sudden major pulse disturbance, should it happen, bearing minimal consequences, if any.

OBJECTS AND ADVANTAGES

Consequently, it is an object of this invention to provide an external neutral grounding device to cope with the EMP-E3 problem simply by applying effectively/carefully basic electricity laws to reduce a circuit current; this result must be accomplished for a quasi permanent operation without any limitation or infringement of equipment standards, insulation guidelines, and particularly on the transformer grounding code. Furthermore, as known from symmetrical component theory, a neutral resistor is three-times more effective than phase ones to limit ground currents, for they get amplified by a factor of three with respect to the corresponding phase ones (the zero sequence resistance sums three times the neutral one); moreover in a system designed basically to be lossless, i.e. having very low resistance, EMP-E3 currents become sensitive to a neutral-resistor insertion, becoming thus a heftily overcoming factor for a many-fold magnitude reduction. Nevertheless the basically lossless qualifier remains, since in balanced three-phase systems there is no steady-state flow through the neutral. What's more these resistive elements have a very long industrial track record and can be built robust, stable and well behaved. In addition neutral-to-ground circuit elements do not get any major power duty, neither bear high voltage. It is also an advantage of this invention to consist of inexpensive standard components of the Distribution Class. Moreover it becomes yet a new advantageous transformer neutral grounding application; a traditional utility practice for a host of other applications.

The foregoing and other objects, features and advantages of the invention will be apparent from the following more particular description of preferred embodiments of the invention, as illustrated in the accompanying drawing.

DESCRIPTION

FIG. 1

FIG. 1 depicts a one-line diagram of a circuit embodying the present invention as it applies to mitigate EMP-E3 currents on a transformer. FIG. 1 also depicts two neutral grounding branches: one having a resistor R10 and the other having a non-linear resistor R11. R10 is a linear resistor, intended to limit such currents. R11 does not have an EMP role but a power-system fault drainage instead. R11 is included distinctly for compliance with Power Apparatus Code Standards.

Operation—FIG. 1

Regarding FIG. 1, it shows a resistor R10 specified according to any given design criteria, reducing thus the EMP-E3 current flowing from the transformer neutral (N) to ground, while R11, in parallel, is designed to bypass R10 should a power fault occur and a transient bleeding or ground reference were required for the neutral point (N). R11 specification and functionality are set by coordinating insulation with the transformer's winding neutral-end Basic Insulation Level (BIL) and Basic Switching Impulse Level (BSL); this in order to provide proper protective margins following well-established IEEE, ANSI, and NEMA guidelines. These features enable this proposed device to be connected to the transformer neutral in a quasi-steady state mode when an EMP/E3 solicitation is envisaged.

CONCLUSION, RAMIFICATIONS AND SCOPE

It should be apparent the present invention is adequate for counteracting potentially severe EMP-E3 currents in a power transformer. Furthermore it yields the following objects and advantages:

it is simple;
it is a passive device;
it is cost effective;
it is energy efficient;
it takes full advantage of the inherent transformer's neutral graded insulation;
it is a transformer neutral grounding application, a well-established utility practice;
its resistive components can be trouble-free switched on/off;
it requires no protective relaying;
it comprises standard distribution voltage components;
it implies a negligible layout change to the transformer substation.

Thus while the preferred embodiments of the invention have been illustrated herein, it is to be understood that changes and variations may be made by those skilled in the art without departing from the spirit and scope of appending claims.

We claim:

1. A passive resistive neutral grounding device to reduce Electromagnetic Pulse E3 induced currents of a star connected three phase winding of a power transformer flowing from neutral to ground without compromising its neutral end insulation comprised of:
   a) A first neutral grounding linear resistor connected from the power transformer neutral to ground so as to become a part of the series circuit where said Electromagnetic Pulse E3 induced currents flow;
   b) A second contingent neutral grounding nonlinear resistor provides a shunting path from the transformer neutral to ground of substantially low resistance as prevailing by virtue of its nonlinearity under large power system fault currents becoming thus a means to sustain proper protective margins to the equipment neutral end basic voltage insulation levels according to recommended insulation coordination guidelines.

2. A passive resistive neutral grounding device to reduce Electromagnetic Pulse E3 induced currents flowing on a star connected three phase winding of a transformer apparatus in a power system comprised of:
   a) An equivalent resistor connected from the transformer neutral to ground so as to become a part of the series circuit where said Electromagnetic Pulse E3 induced currents flow said equivalent resistor having a selected substantially constant ohmic value for the range of said Electromagnetic Pulse E3 induced currents so as to become a magnitude reducing means to said Electromagnetic Pulse E3 induced currents;
   b) A contingent bypass nonlinear resistor connected from the transformer neutral to ground as a path of low resistance to contingent power system AC fault currents so as to become a protecting means for the transformer winding neutral end insulation.

3. The passive resistive neutral grounding device of claim 2 that comprises a resistive means.

* * * * *